US009123266B2

(12) United States Patent
Bastani et al.

(10) Patent No.: US 9,123,266 B2
(45) Date of Patent: Sep. 1, 2015

(54) SEAMLESS TILEABLE DISPLAY WITH PERIPHERAL MAGNIFICATION

(71) Applicant: Google Inc., Mountain View, CA (US)

(72) Inventors: Behnam Bastani, San Jose, CA (US); Mary Lou Jepsen, Sausalito, CA (US); Belle Fu, Taipei (TW)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 14/084,430

(22) Filed: Nov. 19, 2013

(65) Prior Publication Data

US 2015/0138755 A1    May 21, 2015

(51) Int. Cl.
*G02F 1/133*     (2006.01)
*G09F 13/04*     (2006.01)

(52) U.S. Cl.
CPC ..................................... *G09F 13/04* (2013.01)

(58) Field of Classification Search
CPC ............... G02F 2001/133388; G02F 1/13458; G02F 1/13439
USPC ................... 349/56, 73, 74, 57, 62, 63, 64, 58
See application file for complete search history.

(56) References Cited

U.S. PATENT DOCUMENTS

| 5,903,328 | A  | * | 5/1999  | Greene et al. ................. 349/73 |
| 5,973,844 | A  |   | 10/1999 | Burger |
| 6,418,267 | B1 | * | 7/2002  | Lowry ......................... 385/147 |
| 6,456,354 | B2 |   | 9/2002  | Greene et al. |
| 6,727,864 | B1 | * | 4/2004  | Johnson et al. ............... 345/1.3 |
| 6,927,908 | B2 |   | 8/2005  | Stark |
| 7,145,611 | B2 |   | 12/2006 | Dubin et al. |
| 7,339,625 | B2 |   | 3/2008  | Matthys et al. |
| 7,495,638 | B2 |   | 2/2009  | Lamvik et al. |
| 7,744,289 | B2 |   | 6/2010  | Hu |
| 7,845,826 | B2 |   | 12/2010 | Aylward et al. |
| 8,369,018 | B2 |   | 2/2013  | Yamada et al. |
| 2003/0117545 | A1 |   | 6/2003 | Coker et al. |
| 2005/0243415 | A1 | * | 11/2005 | Lowe et al. ................... 359/443 |
| 2006/0012733 | A1 | * | 1/2006 | Jin et al. ......................... 349/73 |

(Continued)

FOREIGN PATENT DOCUMENTS

| KR | 2006-0023832 A |   | 3/2006 |
| KR | 10-0959157 | * | 5/2010 ............... H04N 5/64 |

(Continued)

OTHER PUBLICATIONS

PCT/US2014/058695—International Search Report and Written Opinion, mail date Dec. 19, 2014, 8 pages.

*Primary Examiner* — Sang V Nguyen
(74) *Attorney, Agent, or Firm* — Blakely Sokoloff Taylor & Zafman LLP

(57) ABSTRACT

A tileable display panel includes a screen layer, a display layer, and an illumination layer. The display layer includes a plurality of transmissive pixels to collectively project a unified image onto the backside of the screen layer. The transmissive pixels disposed within a perimeter region of the display layer have smaller transmission apertures than the transmissive pixels disposed within a central region of the display layer. The illumination layer generates lamp light to illuminate a backside of the display layer. The illumination layer is coupled to generate the lamp light incident on the backside of the display layer in the perimeter region with greater divergence than the lamp light incident on the backside of the display layer in the central region.

20 Claims, 7 Drawing Sheets

(56) References Cited

U.S. PATENT DOCUMENTS

| | | |
|---|---|---|
| 2007/0132778 A1* | 6/2007 | Gallen et al. .................. 345/600 |
| 2008/0174515 A1* | 7/2008 | Matthies et al. ............... 345/1.3 |
| 2010/0177261 A1 | 7/2010 | Jin et al. |
| 2011/0215990 A1 | 9/2011 | Liesenberg |
| 2013/0093646 A1* | 4/2013 | Curtis et al. .................. 345/1.3 |
| 2013/0278872 A1 | 10/2013 | Teller et al. |
| 2014/0063422 A1* | 3/2014 | Chu .............................. 349/110 |

FOREIGN PATENT DOCUMENTS

| | | |
|---|---|---|
| KR | 10-0959157 B1 | 5/2010 |
| KR | 10-0959157 B1 | 5/2011 |

* cited by examiner

SEAMLESS TILEABLE DISPLAY WITH PERIPHERAL MAGNIFICATION

TECHNICAL FIELD

This disclosure relates generally to optical displays, and in particular but not exclusively, relates to seamless tiling of optical displays.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for a seamless tileable display with peripheral magnification are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
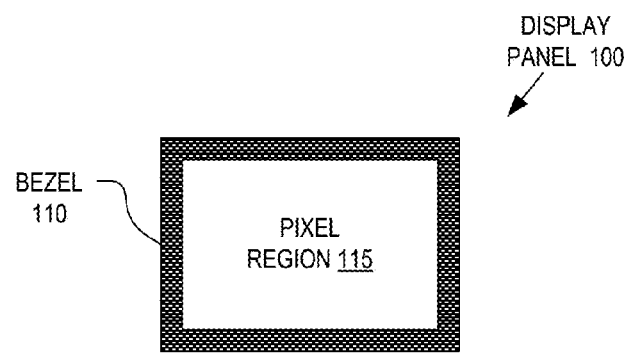
FIGS. 1A & 1B illustrate conventional display panel tiling.
Figure 1B:
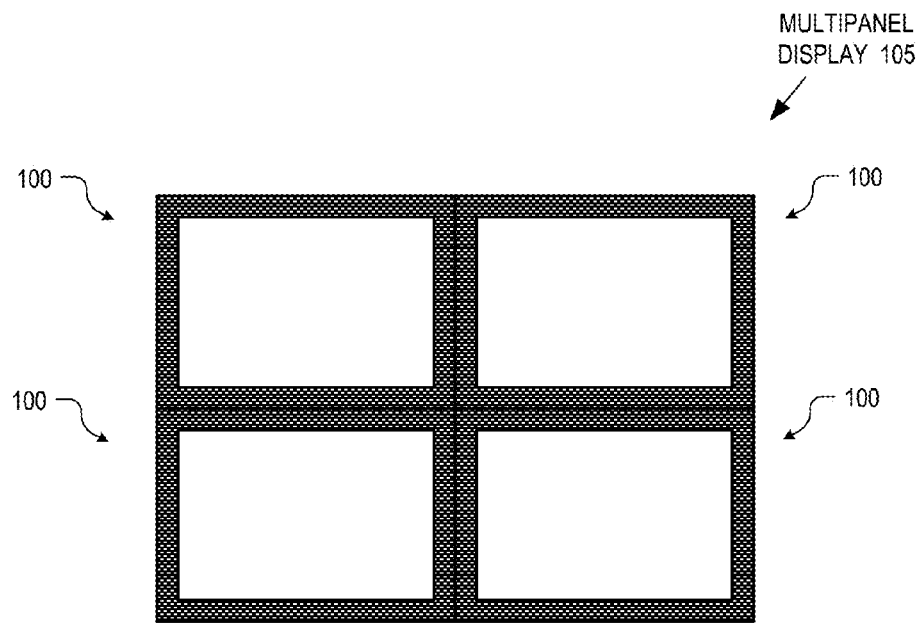
Figure 2A:
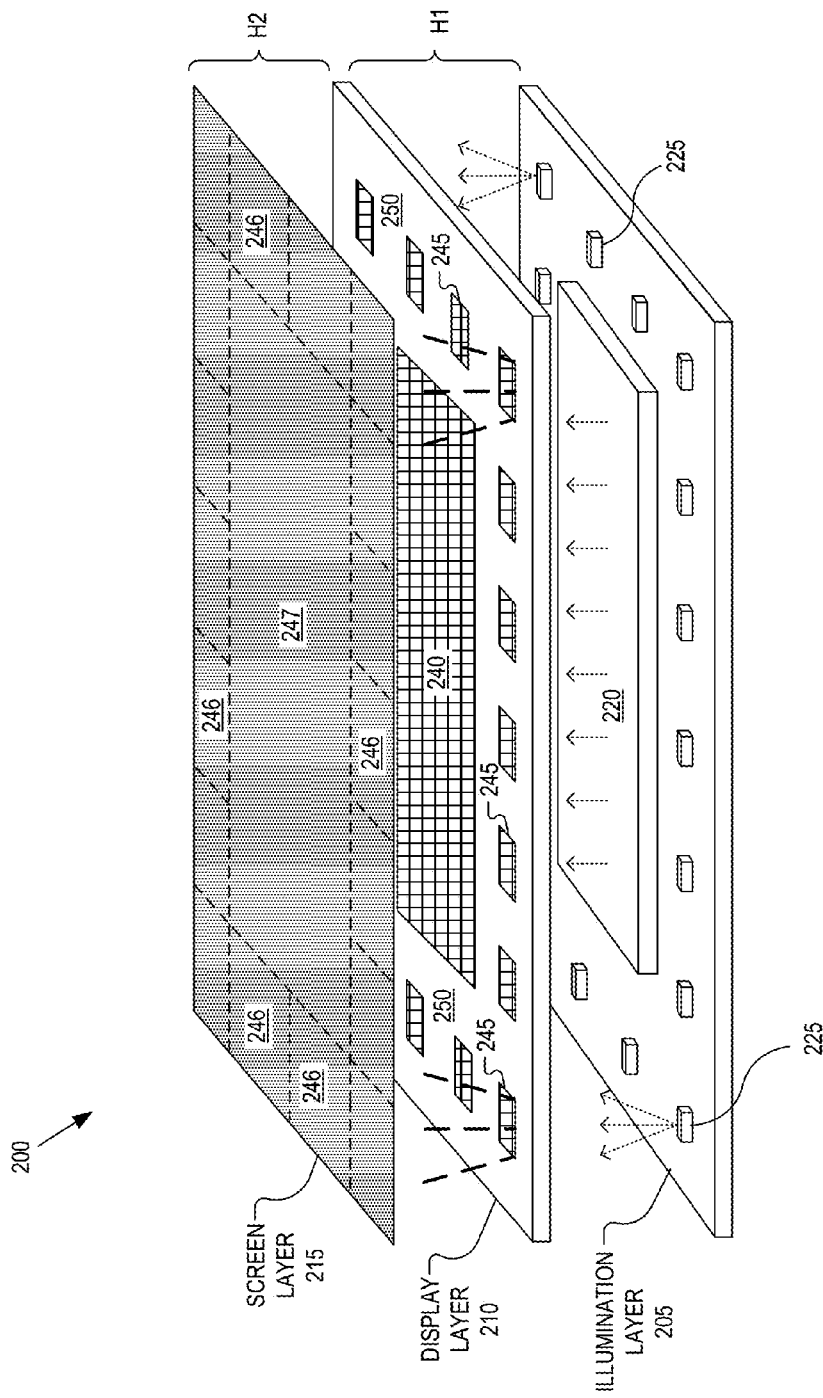
FIG. 2A is a perspective view illustrating functional layers of a tileable display panel, in accordance with an embodiment of the disclosure.
Figure 2B:
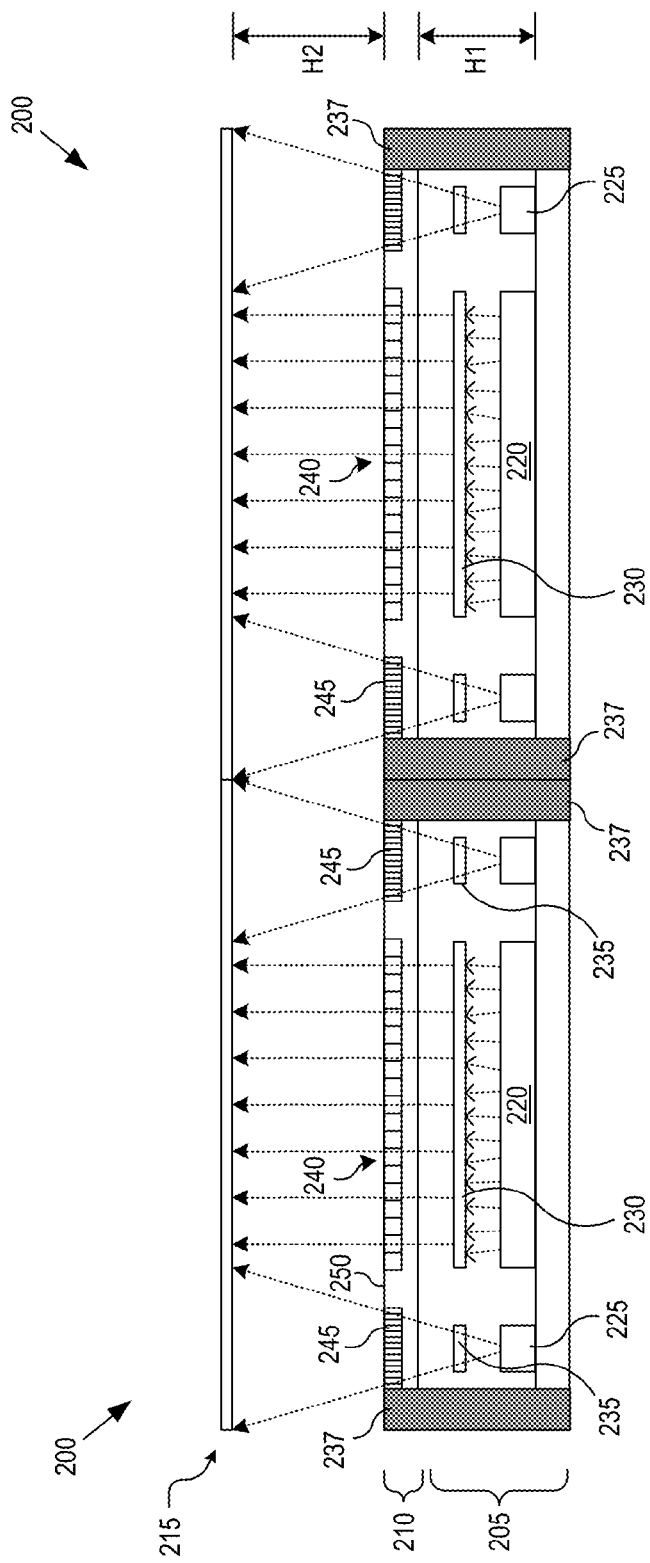
FIG. 2B is a cross-sectional view of functional layers of two tileable display panels each including a diffuse radiator module and near-point-source radiators, in accordance with an embodiment of the disclosure.

FIGS. 2A and 2B illustrate a tileable display panel 200 including a diffuse radiator module and near-point-source radiators, in accordance with an embodiment of the disclosure. FIG. 2A is a perspective view illustrating functional layers of tileable display panel 200, while FIG. 2B is a cross-sectional view of two tileable display panels 200 aligned side-by-side to form a multi-panel display. The illustrated embodiment of tileable display panel 200 includes an illumination layer 205, a display layer 210, and a screen layer 215. Illumination layer 205 includes a diffuse radiator module 220, near-point-source radiators 225, a light conditioning layer 230 (FIG. 2B), lens elements 235 (FIG. 2B), and bezel housing 237 (FIG. 2B). Light conditioning layer 230, lens elements 235, and bezel housing 237 are omitted from FIG. 2A and only illustrated in FIG. 2B so as not to obscure the other features in FIG. 2A. The illustrated embodiment of display layer 210 includes a central pixel array 240 and perimeter pixelets 245 separated from each other by spacing regions 250.

During operation, illumination layer 205 generates lamp light that illuminates the backside of display layer 210. Display layer 210 includes central pixel array 240 and perimeter pixelets 245, which are both arrays of transmissive display pixels, such as liquid crystal displays. Pixelets 245 and pixel array 240 project images onto the backside of screen layer 215, which is a matte material, such as a diffusive rear-projection screen. Each pixelet 245 projects a separate sub-image 246 while pixel array 240 projects a sub-image 247 onto screen layer 215. Sub-images 246 and 247 are aligned and seamlessly blend together into a unified image on screen layer 215. In one embodiment, central pixel array 240 is similar to perimeter pixelets 245, but includes a larger number of transmissive pixels (i.e., larger array), and in some embodiments, includes transmissive pixels having larger transmission apertures as well.

Illumination layer 205 and display layer 210 are separated from each other by a fixed distance H1 (e.g., 8 mm). This separation may be achieved using a transparent intermediary (e.g., glass or plastic layers) and optical elements (e.g., lenses, optical films, apertures, beam confiners, etc.) to control or manipulate the angular extent and cross-sectional shape of the lamp light emitted from near-point-source radiator 225 and diffuse radiator module 220. In one embodiment, an illumination controller is included within illumination layer 205 and coupled to near-point-source radiator 225 and diffuse radiator module 220 to control their luminosity and/or chromaticity.

Perimeter pixelets 245 are illuminated by near-point-source radiators 225. Near-point-source radiators 225 may be implemented as independent light sources (e.g., color or monochromatic LEDs, quantum dots, small emission apertures, etc.) that emit light with a defined angular spread or cone to fully illuminate their corresponding pixelet 245 residing above on display layer 210. Lens elements 235 may be included between near-point-source radiators 225 and the corresponding pixelet 245 to further control the divergence and cross-sectional shape of the lamp light. For example, each lens element 235 may be implemented with a refractive micro-lens having an defined aperture size and shape to control the cross-sectional shape of the light cone. The divergent nature of the lamp light emitted from near-point-source radiators 225 provides magnification to sub-images 246 projected by perimeter pixelets 245. Screen layer 215 may be offset (distance H2) from display layer 210 using a transparent substrate to achieve a desired magnification factor (e.g., 1.5 or otherwise). This magnification laterally expands sub-images 246 to overlap bezel housing 237 and spacing regions 250 and cover them from view on the front side of tileable display panel 200. Accordingly, as illustrated in FIG. 2B, tileable display panels 200 can be aligned and mated with adjacent tileable display panels 200 to form larger multi-panel displays of variable size with little or no discernible seams. By including communication ports within bezel housing 237, the tileable display panels can be communicatively interlinked to collectively display a multi-panel image.

In the illustrated embodiment, diffuse radiator module 220 is aligned under central pixel array 240. Diffuse radiator module 220 is a large monolithic light source that generates diffuse, Lambertian light that is collimated by light conditioning layer 230 prior to illuminating the underside of central pixel array 240. Diffuse radiator module 220 may be implemented using a diffusor or diffusing light guide that may be edge or rear illuminated via one or more LEDs or other light sources.

Light conditioning layer 230 operates to collimate the diffused light emitted from diffuse radiator module 220. As such, the backlight incident upon central pixel array 240 is substantially not divergent and therefore the sub-image 247 is not substantially expanded or magnified. In order to ensure that the unified image is not distorted and the image pixels projected onto screen layer 215 are consistent in size between sub-images 246 and sub-image 247, in one embodiment, the transmissive pixels of central pixel array 240 have larger transmission apertures than the transmissive pixels within pixelets 245. The size deviation is selected to offset the magnification imparted by the divergent lamp light output from near-point-source radiators 225.

Light conditioning layer 230 may be implemented using a variety of different technologies as known in the art. In one embodiment, light conditioning layer 230 may be implemented as an array of micro-lenses. In another embodiment, light conditioning layer 230 may be implemented as a film with embedded micro-structures, such as an array of vertically aligned micro-fibers (e.g., a thin cross-sectional slice of a fused fiber bundle). The film may include other features such as bottom side reflective coating between the entry apertures of the micro-fibers to increase efficiency and/or light absorbing coatings on the inside of the surface of the micro-fibers to absorb non-vertically aligned light. Of course, other multi-layer films or optical structures may be used to collimate diffused light output from diffuse radiator module 220.

The use of pixelets 245 and divergent light emitted from near-point-source radiators 225 facilitates concealing bezel housing 237 and spacing regions 250, both of which may be used to locate hidden electronics within tileable display panel 200. Spacing regions 250 are larger than the inter-pixel separation pitch of pixel array 240 or pixelets 245 and can even be large enough to locate various electronics. For example, the magnified sub-images 246 can be expanded to conceal a 2 mm bezel trim and/or a 4 mm spacing region 250 separating adjacent pixelets 245. As such, the greater the number of pixelets 245 incorporated into the design of tileable display panel 200, the greater the space that can be concealed. However, each pixelet 245 creates a separate sub-image 246 that must be aligned to its neighboring sub-images, its luminosity and chromaticity must be calibrated to blend with its neighboring sub-images, and calibration drift during operation should be kept within tolerances or actively monitored and balanced. As such, increasing the number of independent light sources and separated pixel arrays has an increase cost associated with alignment and calibration to achieve seamless and uniform image quality across the unified image. Since bezel housing 237 is only present around the perimeter of tileable display panel 200, image magnification to conceal bezel housing 237 is only necessary around the perimeter. Accordingly, in the illustrated embodiment, the number of sub-images 246 is reduced by using a large central sub-image 247 surrounded by smaller sub-images 246. The large central sub-image 247 can then be generated with a single uniform backlight module and common pixel array, thereby reducing the number of independent sub-images to align and calibrate across tileable display panel 200.

Figure 3:
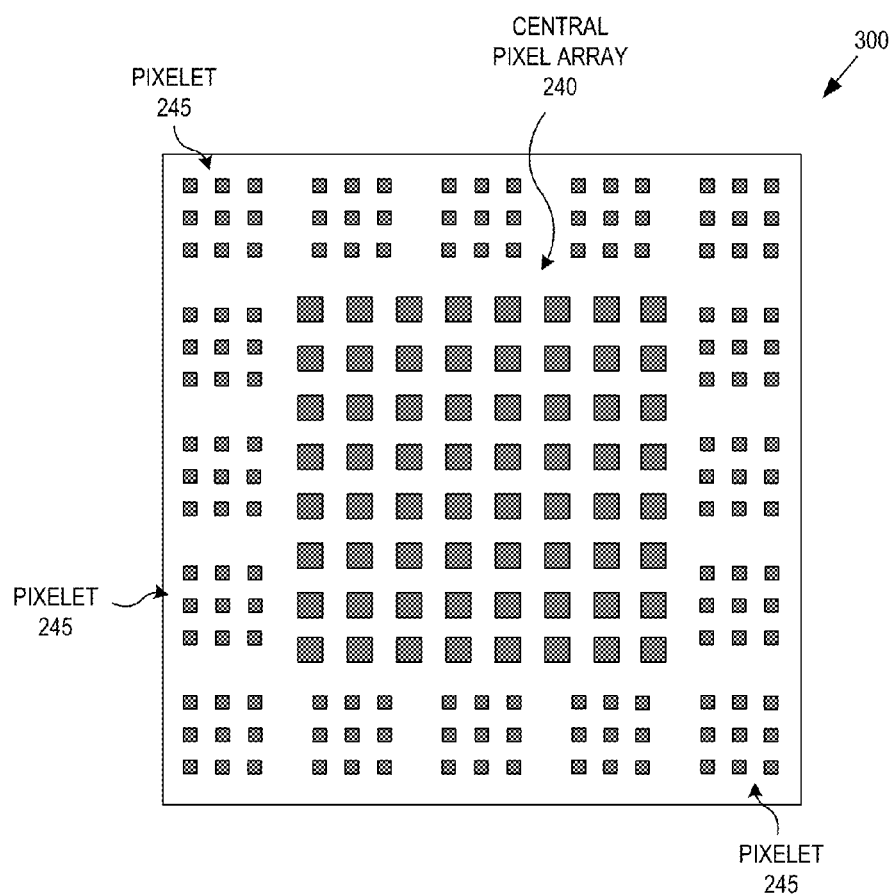
FIG. 3 is a plan view illustrating perimeter pixelets and a central pixel array on the display layer of a tileable display panel, in accordance with an embodiment of the disclosure.

FIG. 3 is a plan view illustrating a demonstrative layout of perimeter pixelets 245 and central pixel array 240 on display layer 300, in accordance with an embodiment of the disclosure. Display layer 300 is one possible implementation of display layer 210 illustrated in FIGS. 2A and 2B. As illustrated, perimeter pixelets 245 are disposed in a perimeter region of display layer 300 and surround central pixel array 240 disposed in the central region of display layer 300.

Display layer 300 illustrates the pixels of pixelets 245 having smaller transmissive apertures than the pixels of central pixel array 240. The smaller size of the pixels in pixelets 245 compensates for the magnification factor imparted by the divergent lamp light illuminating pixelets 245 relative to the collimated lamp light illuminating central pixel array 240. Although FIG. 3 illustrates only two different pixel sizes with an abrupt changed between pixels of pixelets 245 in the perimeter region vs the pixels of central pixel array 240 in the central region, in other embodiments (not illustrated), the pixel sizes may change continuously across the surface of display layer 210 with a gradual decrease in size as the pixels move out from the center of display panel 300.

Although FIG. 3 illustrates sixteen pixelets 245 each implemented as a 3×3 array of transmissive pixels surrounding central pixel array 240 implemented as a 8×8 array of transmissive pixels, it should be appreciated that FIG. 3 is merely demonstrative and not intended to be a schematic representation. Actual implementations may include pixelets 245 each implemented as transmissive pixel arrays of 100's× 100's of pixels, while central pixel array 240 may be implemented as a transmissive pixel array on the order of 1000's× 1000's of pixels. Similarly, various embodiments, may include more than one column or row of pixelets 245 disposed along a given side of display panel 300. Pixelets 245 and central pixel array 240 need not have square dimensions, but rather may be rectangular in shape. Of course, other sizes and layouts may be implemented.

Figure 4:
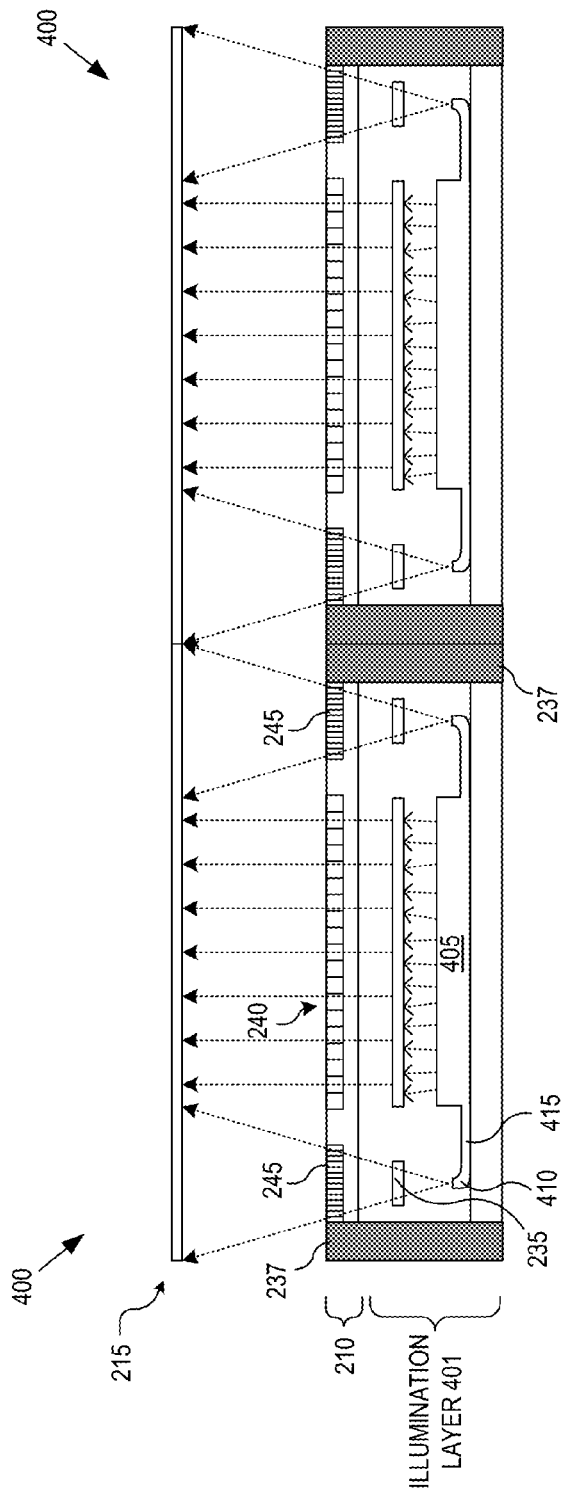
FIG. 4 is a cross-sectional view of functional layers of two tileable display panels each including a diffuse radiator module and near-point-source radiators implemented with light guides, in accordance with an embodiment of the disclosure.

FIG. 4 is a cross-sectional view of functional layers of two tileable display panels 400 each including a diffuse radiator module 405 and near-point-source radiators 410 implemented with light guides 415, in accordance with an embodiment of the disclosure. Tileable display panels 400 are similar to tileable display panels 200 described above except for changes to illumination layer 401 described below. In particular, illumination layer 401 implements near-point-source radiators 410 using small emission apertures of light guides 415 instead of independent light sources.

Light guides 415 route outward from diffuse radiator module 405 to locations centrally located under each pixelet 245, at which point the light is diverted up towards pixelets 245 on display layer 210. The light emitted from light guides 415 may be diverted upward using angled mirrors, by curving the ends of light guides 415 so that their emission apertures are facing upward, by forming emission apertures on the topside of light guides 415 in appropriate locations, or otherwise. As illustrated, light guides 415 tap into the light generated by diffuse radiator module 405. Uniform chromaticity is inherent in the design. Controlling the fixed size of the emission apertures of light guides 415 provides a sort of gross control over the divergence of the lamp light emitted from near-point-source radiators 410, while further control over divergence can be achieved by lens elements 235. By designing the emission apertures of light guides 415 to be sufficiently small, they resemble near-point-source radiators such that the light incident upon the backside of a given pixel within pixelets 245 is locally near-collimated for that pixel. Stated another way, light incident upon a given location of a pixelet originates from only a single direction. This locally near-collimated nature of a point-source radiator or near-point-source radiator preserves the image quality projected onto screen layer 215.

Figure 5:
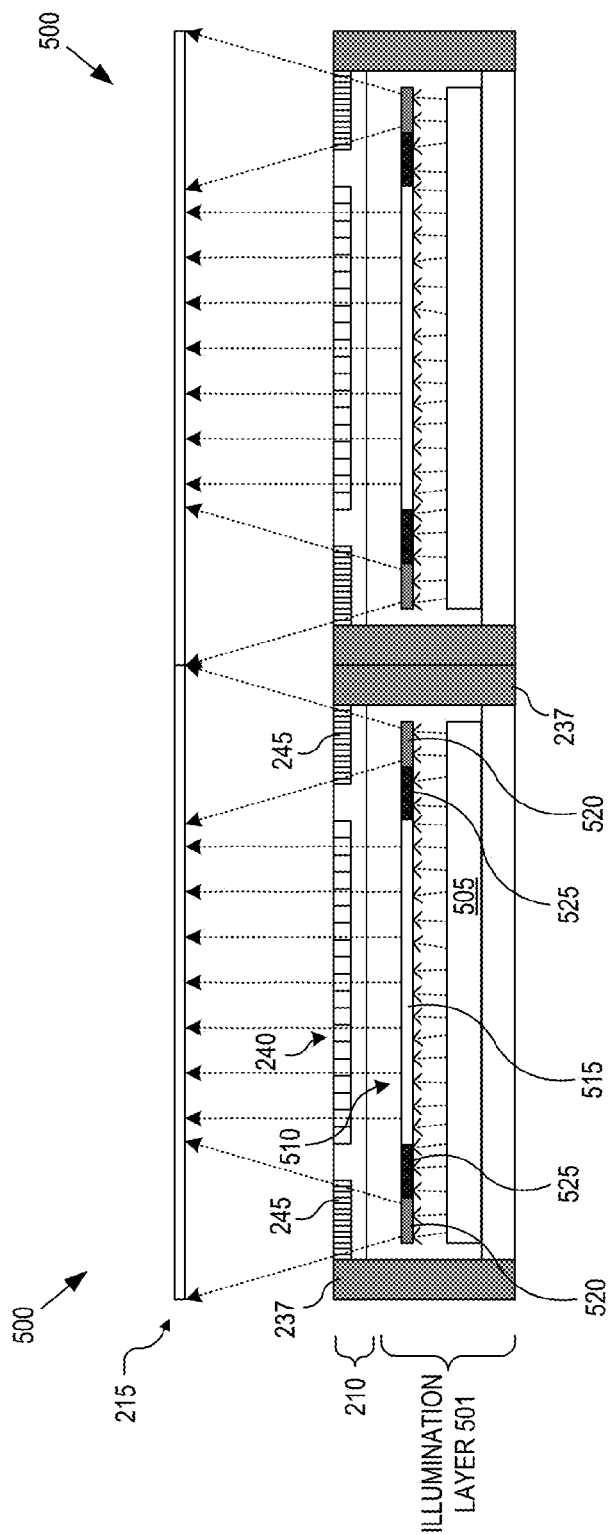
FIG. 5 is a cross-sectional view of functional layers of two tileable display panels each including a single diffuse radiator module for backlighting, in accordance with an embodiment of the disclosure.

FIG. 5 is a cross-sectional view of functional layers of two tileable display panels 500 each including a single diffuse radiator module 505 for backlighting, in accordance with an embodiment of the disclosure. Tileable display panels 500 are similar to tileable display panels 200 described above except for changes to illumination layer 501 described below. The illustrated embodiment of illumination layer 501 includes a diffuse radiator module 505 and a light conditioning layer 510. The illustrated embodiment of light conditioning layer 510 includes a central portion 515, perimeter portion 520, and a blackout region 525.

Diffuse radiator module 505 and light conditioning layer 510 extend under both the central and perimeter regions of display layer 210. Diffuse radiator module 505 generates lamp light for illuminating the entire display layer 210. This provides uniform light characteristics for backlighting the entire display layer 210. Diffuse radiator module 505 emits diffuse lamp light incident upon central portion 515 of light conditioning layer 510. Central portion 515 of light conditioning layer 510 operates to collimate the diffuse lamp light as discussed above. In contrast, perimeter portion 520 does not fully collimate the lamp light emitted from diffuse radiator module 505, but rather transforms the light into a series of near-point-sources, one under each pixelet 245, having a defined divergence to provide magnification to pixelets 245. In one embodiment, diffuse radiator module 505 includes small emission apertures each aligned under a corresponding pixelet 245. These emission apertures release divergent light from the diffuse lamp light generated within diffuse radiator module 505. Perimeter portion 520 may be fabricated, using known techniques for manipulating the divergence of this light. In other embodiments, perimeter portion 520 of light conditioning layer 510 generates divergent near-point-source light from diffuse lamp light. Blackout region 525 separates the perimeter portion 520 from central portion 515 of light conditioning layer 510 to provide room for the divergent light projected through pixelets 245 to expand onto screen layer 215.

Figure 6:
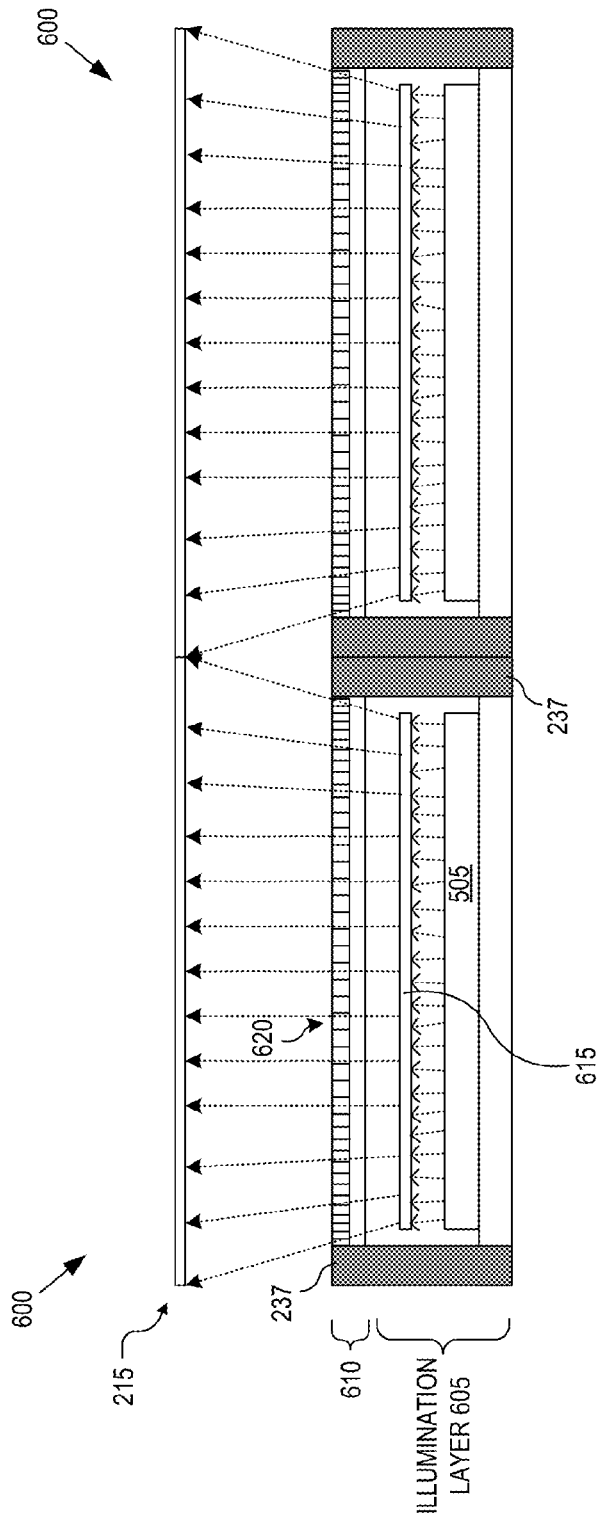
FIG. 6 is a cross-sectional view of functional layers of two tileable display panels each including a single diffuse radiator module and a continuous light conditioning layer, in accordance with an embodiment of the disclosure.

FIG. 6 is a cross-sectional view of functional layers of two tileable display panels 600 each including a single diffuse radiator module and a continuous light conditioning layer, in accordance with an embodiment of the disclosure. The illustrated embodiments of tileable display panels 600 each include an illumination layer 605, a display layer 610, and a screen layer 215. The illustrated embodiment of illumination layer 605 includes diffuse radiator module 505 and light conditioning layer 615. The illustrated embodiment of display layer 610 includes a continuous pixel array 620.

Tileable display panels 600 are similar to tileable display panels 500 except that the pixels of continuous pixel array 620 gradually change in size and spacing as opposed to having distinct perimeter pixelets and a central pixel array having different pixel sizes. Accordingly, the transmission aperture size of the transmissive pixels within continuous pixel array 620 gradually decreases in size from a central region of display layer 610 to a perimeter region of display layer 610. Since continuous pixel array 620 has a gradually changing pixel structure, light conditioning layer 615 also has a gradually changing structure to transform diffuse lamp light emitted from diffuse radiator module into collimated light incident upon a central region of continuous pixel array 620 and divergent light, which is locally collimated at a pixel level of granularity, incident upon the perimeter region of continuous pixel array 620. Light conditioning layer 615 may be implemented using the structures describe above for the light conditioning layers, but by having the structures gradually change radially outward from its center to provide fully collimated light in the middle and divergent light near the periphery. The gradually changing nature of light conditioning layer 615 changes at a rate to compensate for the gradually changing pixel size in display layer 610 such that the pixel images projected onto screen layer 215 remain substantially constant in size across screen layer 215.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A tileable display panel, comprising:
   a screen layer upon which a unified image is projected from a backside;
   a display layer including a plurality of transmissive pixels to collectively project the unified image onto the backside of the screen layer, wherein the transmissive pixels disposed within a perimeter region of the display layer have smaller transmission apertures than the transmissive pixels disposed within a central region of the display layer; and an illumination layer to generate lamp light to illuminate a backside of the display layer, wherein the illumination layer is coupled to generate the lamp light incident on the backside of the display layer in the perimeter region with greater divergence than the lamp light incident on the backside of the display layer in the central region, wherein the smaller transmission apertures of the transmissive pixels disposed within the perimeter region are sized to counterbalance the divergence of the lamp light incident upon the perimeter region such that image pixels projected onto the backside of the screen layer are substantially uniform in size from center to periphery across the screen layer, wherein the illumination layer includes:
a diffuse radiator module centrally disposed on the illumination layer to emit diffuse lamp light to the central region of the display layer; and
a light conditioning layer disposed between the diffuse radiator module and the display layer to collimate the diffuse lamp light prior to incidence upon the central region of the display layer.

2. A display panel, comprising:
a screen layer upon which a unified image is projected from a backside;
a display layer including a plurality of transmissive pixels to collectively project the unified image onto the backside of the screen layer, wherein the transmissive pixels disposed within a perimeter region of the display layer have smaller transmission apertures than the transmissive pixels disposed within a central region of the display layer; and
an illumination layer to generate lamp light to illuminate a backside of the display layer, wherein the illumination layer is coupled to generate the lamp light incident on the backside of the display layer in the perimeter region with greater divergence than the lamp light incident on the backside of the display layer in the central region,
wherein the illumination layer includes:
a diffuse radiator module disposed on the illumination layer to emit diffuse lamp light to the central region of the display layer; and
a light conditioning layer disposed between the diffuse radiator module and the display layer to substantially collimate the diffuse lamp light prior to incidence upon the central region of the display layer.

3. The display panel of claim 2, wherein the illumination layer further includes:
a plurality of near-point-source radiators peripherally disposed about the illumination layer around the diffuse radiator module to emit divergent lamp light to the perimeter region of the display layer.

4. The display panel of claim 3, wherein the illumination layer further includes:
a plurality of lens elements disposed between the near-point-source radiators and the display layer, each of the lens elements disposed over a corresponding one of the near-point-source radiators between to adjust a divergence and cross-sectional shape of the divergent lamp light.

5. The display panel of claim 3, wherein the near-point-source radiators comprise emission apertures of light guides coupled to tap off lamp light from the diffuse radiator module, wherein the light guides are routed out from the diffuse radiator module.

6. The display panel of claim 2, wherein the diffuse radiator module extends under both the central and perimeter regions of the display layer and wherein the light conditioning layer extends under both the central and perimeter regions, the light conditioning layer including:
a central portion to collimate the diffuse lamp light prior to incidence upon the central region of the display layer; and
a perimeter portion that manipulates the diffuse lamp light to have a specified divergence.

7. The display panel of claim 6, wherein the light conditioning layer further includes:
a blackout region disposed between the central portion and the perimeter portion.

8. The display panel of claim 2, wherein the display layer further comprises:
a spacing region disposed between the perimeter region and the central region to separate the transmissive pixels of the perimeter region from the transmissive pixels of the central region by an offset distance greater than an inter-pixel separation pitch between the transmissive pixels of the central region.

9. The display panel of claim 2,
wherein the diffuse radiator module and the light conditioning layer extend under both the central and perimeter regions of the display layer,
wherein the display layer comprises a continuous pixel array and the transmission apertures of the transmission pixels gradually become smaller from the central region to perimeter region of the display layer, and
wherein the light conditioning layer comprises a continuous light conditioning layer that gradually changes the divergence of the lamp light incident upon the backside of the display layer from collimated in the central region to divergent in the perimeter region.

10. The display panel of claim 2, further comprising:
a bezel housing surrounding the illumination layer and the display layer, wherein a periphery of the unified image projected onto the backside of the screen layer is expanded by the divergence of the lamp light incident on the perimeter region of the display layer to overlap and conceal the bezel housing from a frontside of the screen layer, wherein the screen layer is a diffusive rear projection screen.

11. A display system, comprising:
a plurality of display panels each housed within a bezel trim that permits the display panels to be aligned relative to each other and communicatively coupled to collectively display a multi-panel image across the display panels, wherein each of the display panels includes:
a screen layer upon which a unified panel image is projected from a backside;
a display layer including a plurality of transmissive pixels to collectively project the unified panel image onto the backside of the screen layer, wherein the transmissive pixels disposed within a perimeter region of the display layer have smaller transmission apertures than the transmissive pixels disposed within a central region of the display layer; and
an illumination layer to generate lamp light to illuminate a backside of the display layer, wherein the illumination layer is coupled to generate the lamp light incident on the backside of the display layer in the perimeter region with greater divergence than the lamp light incident on the backside of the display layer in the central region, wherein the multi-panel image is expanded along perimeters of each of the display panels by the divergence of the lamp light incident on the perimeter region of the display layers to overlap the bezel trims and conceal the bezel trims of the display panels from a frontside of the screen layers, wherein the illumination layer includes:
a diffuse radiator module disposed on the illumination layer to emit diffuse lamp light to the central region of the display layer; and
a light conditioning layer disposed between the diffuse radiator module and the display layer to substantially collimate the diffuse lamp light prior to incidence upon the central region of the display layer.

12. The display system of claim 11, wherein the divergence of the lamp light incident upon the perimeter region is counterbalanced by the smaller transmission apertures of the transmissive pixels disposed within the perimeter region such that image pixels projected onto the backside of the screen layer are substantially uniform in size from center to periphery across the screen layer.

13. The display system of claim 11, wherein the illumination layer further includes:
a plurality of near-point-source radiators peripherally disposed about the illumination layer around the diffuse radiator module to emit divergent lamp light to the perimeter region of the display layer.

14. The display system of claim 13, wherein the illumination layer further includes:
a plurality of lens elements disposed between the near-point-source radiators and the display layer, each of the lens elements disposed over a corresponding one of the near-point-source radiators between to adjust a divergence and cross-sectional shape of the divergent lamp light.

15. The display system of claim 13, wherein the near-point-source radiators comprise emission apertures of light guides coupled to tap off lamp light from the diffuse radiator module, wherein the light guides are routed out from the diffuse radiator module.

16. The display system of claim 11, wherein the diffuse radiator module extends under both the central and perimeter regions of the display layer and wherein the light conditioning layer extends under both the central and perimeter regions, the light conditioning layer including:

a central portion to collimate the diffuse lamp light prior to incidence upon the central region of the display layer; and
a perimeter portion that manipulates the diffuse lamp light to have a specified divergence.

17. The display system of claim 16, wherein the light conditioning layer further includes:
a blackout region disposed between the central portion and the perimeter portion.

18. The display system of claim 11, wherein the display layer further comprises:
a spacing region disposed between the perimeter region and the central region to separate the transmissive pixels of the perimeter region from the transmissive pixels of the central region by an offset distance greater than an inter-pixel separation pitch between the transmissive pixels of the central region.

19. The display system of claim 11,
wherein the diffuse radiator module and the light conditioning layer extend under both the central and perimeter regions of the display layer,
wherein the display layer comprises a continuous pixel array and the transmission apertures of the transmission pixels gradually become smaller from the central region to perimeter region of the display layer, and
wherein the light conditioning layer comprises a continuous light conditioning layer that gradually changes the divergence of the lamp light incident upon the backside of the display layer from collimated in the central region to divergent in the perimeter region.

20. A display panel, comprising:
a screen layer upon which a unified image is projected from a backside;
a display layer including a plurality of transmissive pixels to collectively project the unified image onto the backside of the screen layer, wherein the transmissive pixels disposed along a perimeter region of the display layer all have smaller transmission apertures than the transmissive pixels disposed within a central region of the display layer; and
an illumination layer to generate lamp light to illuminate a backside of the display layer, wherein the illumination layer is coupled to generate the lamp light incident on the backside of the display layer in the perimeter region with greater divergence than the lamp light incident on the backside of the display layer in the central region.

* * * * *